United States Patent [19]
Tadych

[11] Patent Number: 5,822,914
[45] Date of Patent: Oct. 20, 1998

[54] WEEDLESS FISHING JIG WITH SIDE-TO-SIDE ACTION

[75] Inventor: John E. Tadych, Franklin, Wis.

[73] Assignee: American Building Restoration Products, Inc., Franklin, Wis.

[21] Appl. No.: 712,858

[22] Filed: Sep. 12, 1996

[51] Int. Cl.$^6$ .......................... A01K 91/00; A01K 85/00
[52] U.S. Cl. ........................ 43/42.39; 43/42.42
[58] Field of Search ................ 43/42.39, 42.4, 43/42.42, 42.37, 43.16, 43.2, 42.28, 42.31, 42.06

[56] References Cited

U.S. PATENT DOCUMENTS

| | | | |
|---|---|---|---|
| 1,178,861 | 4/1916 | Kruschke . | |
| 1,535,957 | 4/1925 | Stanley et al. . | |
| 1,645,644 | 10/1927 | Davenport | 43/42.4 |
| 2,539,605 | 1/1951 | Bailey | 43/42.42 |
| 2,576,795 | 11/1951 | Lane | 43/42.42 |
| 2,765,572 | 10/1956 | Woolfe | 43/42.39 |
| 3,191,336 | 6/1965 | Cordell, Jr. . | |
| 3,750,321 | 8/1973 | McClellan | 43/42.39 |
| 3,867,781 | 2/1975 | Wolfe | 43/42.39 |
| 3,909,974 | 10/1975 | Kent | 43/42.39 |
| 4,044,490 | 8/1977 | Young et al. | 43/42.06 |
| 4,045,903 | 9/1977 | Parker | 43/42.39 |
| 4,428,144 | 1/1984 | Dickinson | 43/42.39 |
| 4,712,326 | 12/1987 | Hoover et al. | 43/42.39 |
| 4,747,228 | 5/1988 | Giovengo, Jr. | 43/42.42 |
| 4,864,766 | 9/1989 | Bohn . | |
| 5,134,800 | 8/1992 | Sheehan et al. . | |
| 5,261,181 | 11/1993 | Melton | 43/42.06 |
| 5,335,442 | 8/1994 | Ahlsten . | |
| 5,444,935 | 8/1995 | Pahle | 43/42.06 |
| 5,595,012 | 1/1997 | Jensen | 43/42.06 |

FOREIGN PATENT DOCUMENTS

| | | | |
|---|---|---|---|
| 711437 | 6/1965 | Canada | 43/42.42 |
| 511609 | 1/1955 | Italy | 43/42.42 |

*Primary Examiner*—Charles Jordan
*Assistant Examiner*—Theresa M. Wesson
*Attorney, Agent, or Firm*—Andrus, Sceales, Starke & Sawall

[57] ABSTRACT

A jig-type fishing lure which simulates the movement of live bait and functions as a weedless fishing lure. The fishing lure includes a typical jig head having a molded head, a hook member, and an attachment eye. A pair of spring arms are attached to the molded head such that the spring arms extend upwardly and outwardly from the molded head and intersect one another. The spring arms contact the bottom of a lake or river to simulate the movement of live bait. Upon contacting a weed, the pair of spring arms deflect to prevent the weed from becoming entangled in the barb of the hook member.

28 Claims, 5 Drawing Sheets

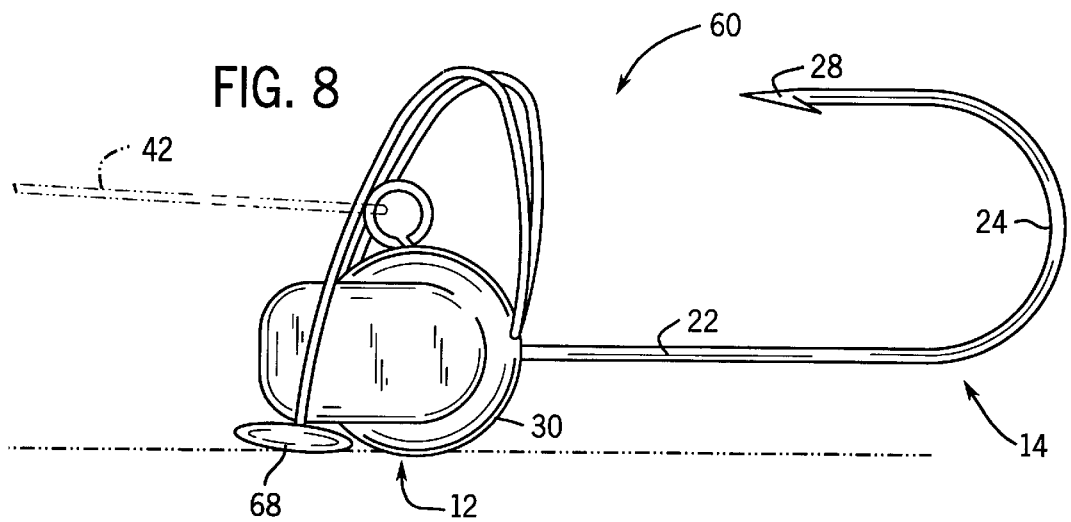
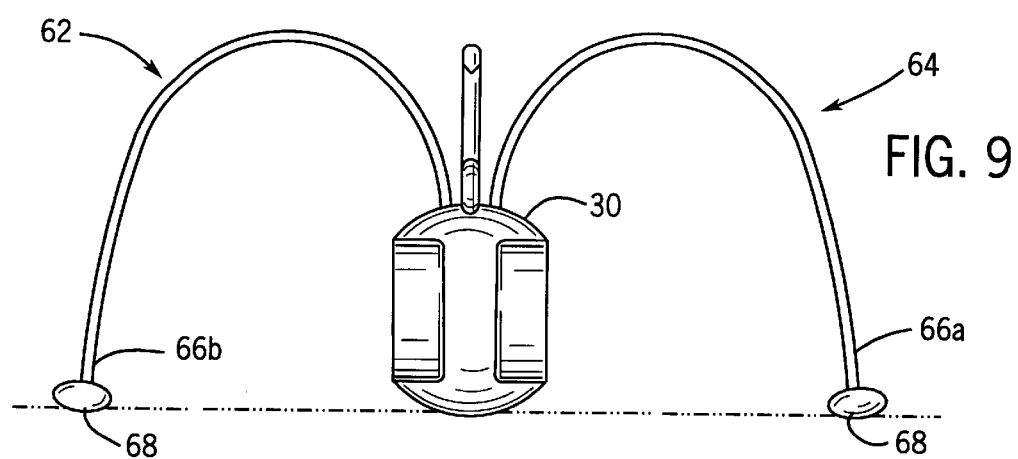
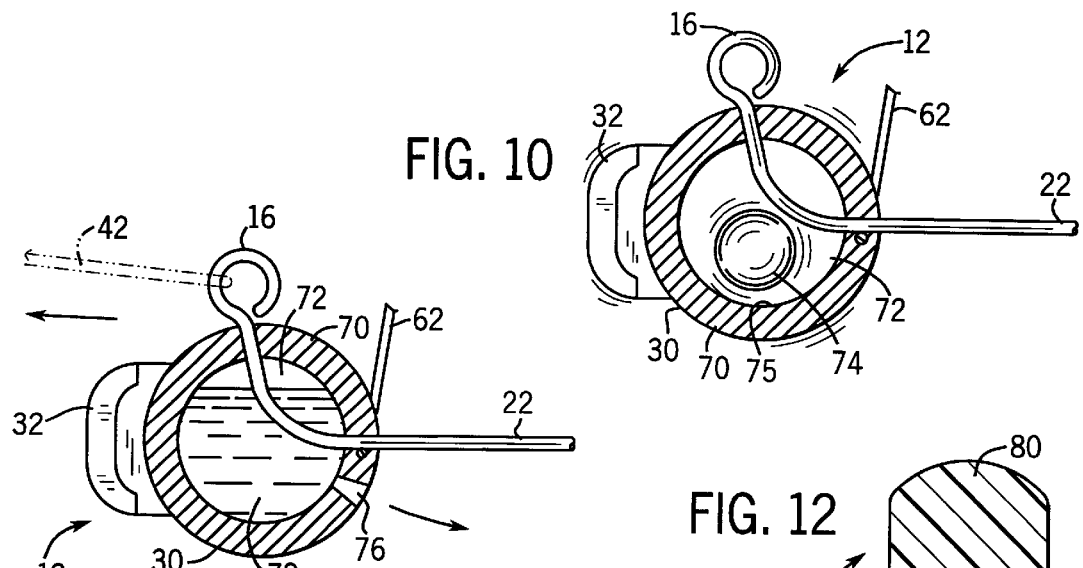
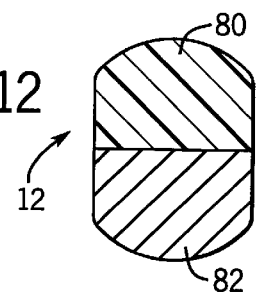

WEEDLESS FISHING JIG WITH SIDE-TO-SIDE ACTION

FIELD OF THE INVENTION

This invention relates to a fishing lure, and more particularly to a fishing lure having a pair of spring arms which act to simulate live bait movement.

BACKGROUND OF THE INVENTION

Fishing jigs are a type of fishing lure characterized by a fish hook having a mass of material, usually metal, formed around the end of the hook opposite the barb to create a jig head. An attachment eye is attached to or extends outwardly from the jig head to provide a point of connection to the fishing line. Typically, a fisherman attaches a piece of bait, such as a minnow, to the hook and either casts the jig head out and reels it in, or dangles the jig head below the fisherman and moves it in an oscillating upward and downward fashion slightly above the lake or river bottom. The jig head is often painted a bright color to attract the attention of the fish.

When a conventional fishing jig as described is cast out and reeled in, the configuration of the jig head creates several drawbacks. First, since jig heads are typically uniform in shape and somewhat streamlined, the fishing jig tends to travel through the water in a straight path, unlike the normal swimming movement of the minnow which is typically attached to the jig. Second, since the jig head is typically made of metal, the jig head normally sinks and travels near the bottom of the lake or river where the exposed hook can easily be entangled in weeds.

Many fishing lures have attempted to simulate live bait movement in the past. Some examples include mechanisms, such as fins, which cause the lure to wobble when the lure is pulled through the water by a fishing line. These types of lures are generally large in size and costly to manufacture.

It is well known in the fishing industry to render a hook weedless by providing a series of reed-like deflectors that originate from the shank of the hook and extend to near the point of the hook. To be effective, the weed deflectors must be stiff enough to deflect the weed so that it will not contact and become entangled in the hook, while not being too stiff to interfere with the setting of the hook in the mouth of the fish.

Therefore, a fishing lure which is easy and inexpensive to manufacture and which simulates live bait movement and contains a weedless feature would be desirable.

SUMMARY OF THE INVENTION

The invention is a fishing lure which simulates live bait movement and contains a weedless feature. The fishing lure is generally comprised of a molded head, a hook member having a longitudinal axis, a pair of spring arms positioned transverse to the longitudinal axis of the hook member, and an attachment eye. The pair of spring arms are attached to the molded head at a first end, and each spring arm extends outwardly relative to the hook member longitudinal axis, terminating in a second end located below the molded head of the lure. Each spring arm is generally comprised of a single piece of resilient wire. Preferably, the second end of each spring arm is positioned forwardly and on the opposite side of the shank relative to the first end, such that the pair of spring arms cross one another at a location between the first end and the second end. As the fishing lure is pulled across the bottom of a lake or river, the spring arms contact the bottom and cause the hook member to oscillate in a manner which simulates live bait.

The point of intersection between the two spring arms is located in front of and above the barb contained on the hook member, such that when a weed or other obstruction contacts either one or both of the spring arms, the spring arms act to deflect the weed and/or other obstruction away from the barb.

In an alternate embodiment of the invention, each of the spring arms includes a float member which acts to position the molded head slightly below the surface of the water during usage. The float members cause the hook member to oscillate as it is pulled through the water, which simulates live bait movement.

The invention also contemplates providing an open interior in the molded head to receive a ball or the like therein, such that the ball contacts the inner wall of the hollow head to create an audible sound.

The invention further contemplates including an inlet/outlet port in the hollow molded head so that a liquid, such as fish attractant, can be placed in the molded head to help attract fish.

Various other features, objects and advantages of the invention will be made apparent from the following detailed description taken together with the drawings.

BRIEF DESCRIPTION OF THE DRAWINGS

The drawings illustrate the best mode presently contemplated of carrying out the invention.

In the drawings:

FIG. 8 is a side elevation view of a second embodiment of the fishing lure of the invention, shown in a resting position;

FIG. 9 is a front elevation view of the fishing lure of FIG. 8, shown in a resting position;

FIG. 10 is a cross-sectional view of the head of a third embodiment of the fishing lure of the invention;

FIG. 11 is a cross-sectional view of the head of a fourth embodiment of the fishing lure of the invention; and FIG. 12 is a cross-sectional view of the head of a fifth embodiment of the fishing lure of the invention.

DETAILED DESCRIPTION OF THE DRAWINGS

Figure 1:
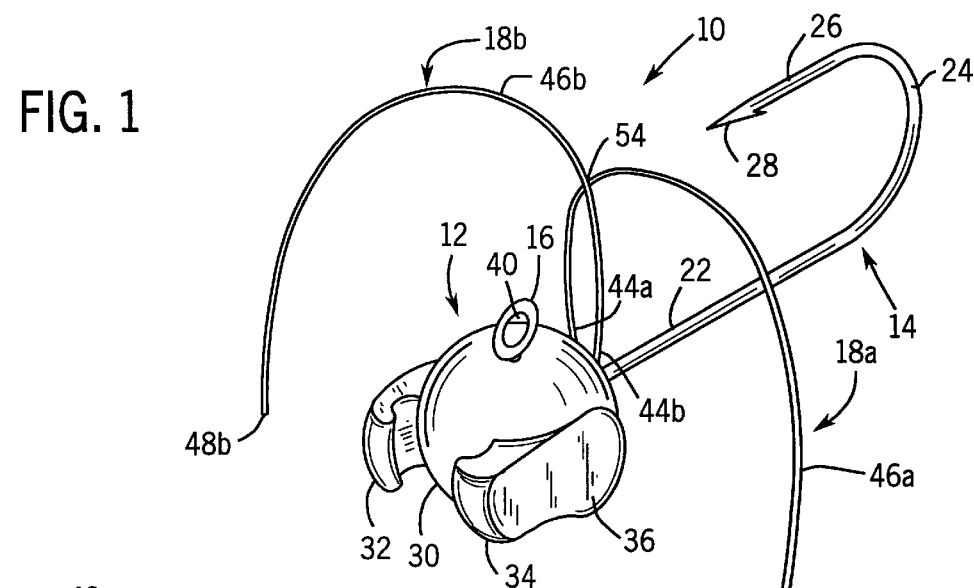
FIG. 1 is an isometric view of the fishing lure constructed according to the invention.

Referring to FIG. 1, the fishing lure of the present invention is designated in its entirety by the reference numeral 10. As illustrated, the fishing lure 10 is generally comprised of a molded head 12, a hook member 14, and an attachment eye 16. Additionally, the fishing lure 10 contains a pair of spring arms 18a and 18b, which will be discussed in greater detail below.

The hook member 14 is comprised of a generally straight shank 22 which projects rearwardly along a longitudinal axis from the tail end of the molded head 12. The shank 22 extends rearwardly until it is bent upward to create a curved section 24. The curved section 24 forms a generally semi-circular configuration and is joined to a tail section 26 that extends forward and generally parallel to the shank 22. In a preferred embodiment of the invention, the tail section 26 terminates in a hook portion of barb 28. The barb 28 is placed on the tail section 26 to securely hold the hook 14 in the mouth of a fish and prevent its removal therefrom.

Figure 2:
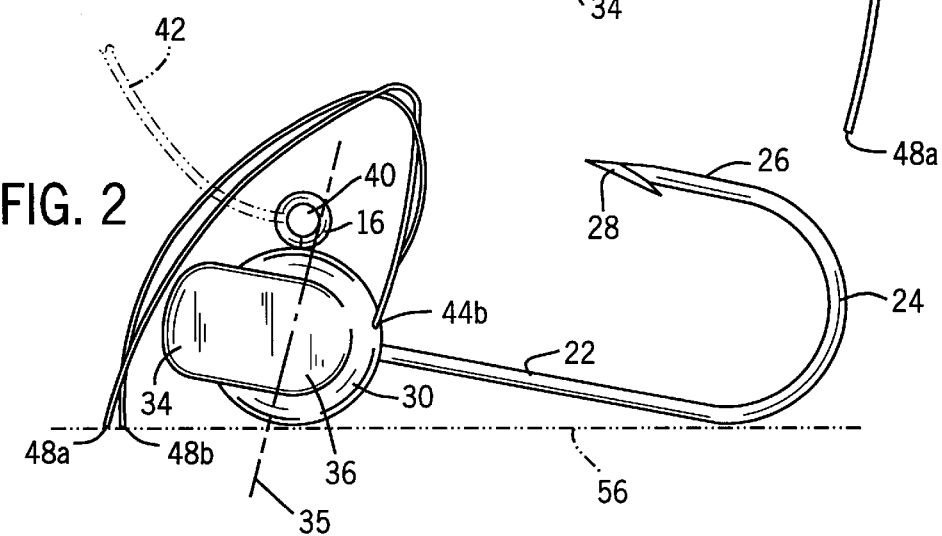
FIG. 2 is a side elevation view of the fishing lure of FIG. 1 in a resting position on a surface.

The molded head 12 consists of a body 30 and a pair of weights 32 and 34 located one on either side of body 30. In the preferred embodiment, the body 30 is generally spherical in shape. As can be seen in FIG. 2, the shank 22 of the hook member 14 is joined to the body 30 at approximately the spherical equator of the body 30.

The pair of weights 32 and 34 are positioned such that they extend forwardly of the front circumferential surface of the body 30. In this manner, the weights 32 and 34 act to position the center of gravity of the body 30 forwardly of the vertical axis 35 of body 30 which extends through the center of the spherical body 30 when the longitudinal axis of the shank 22 is positioned horizontally.

Figure 4:
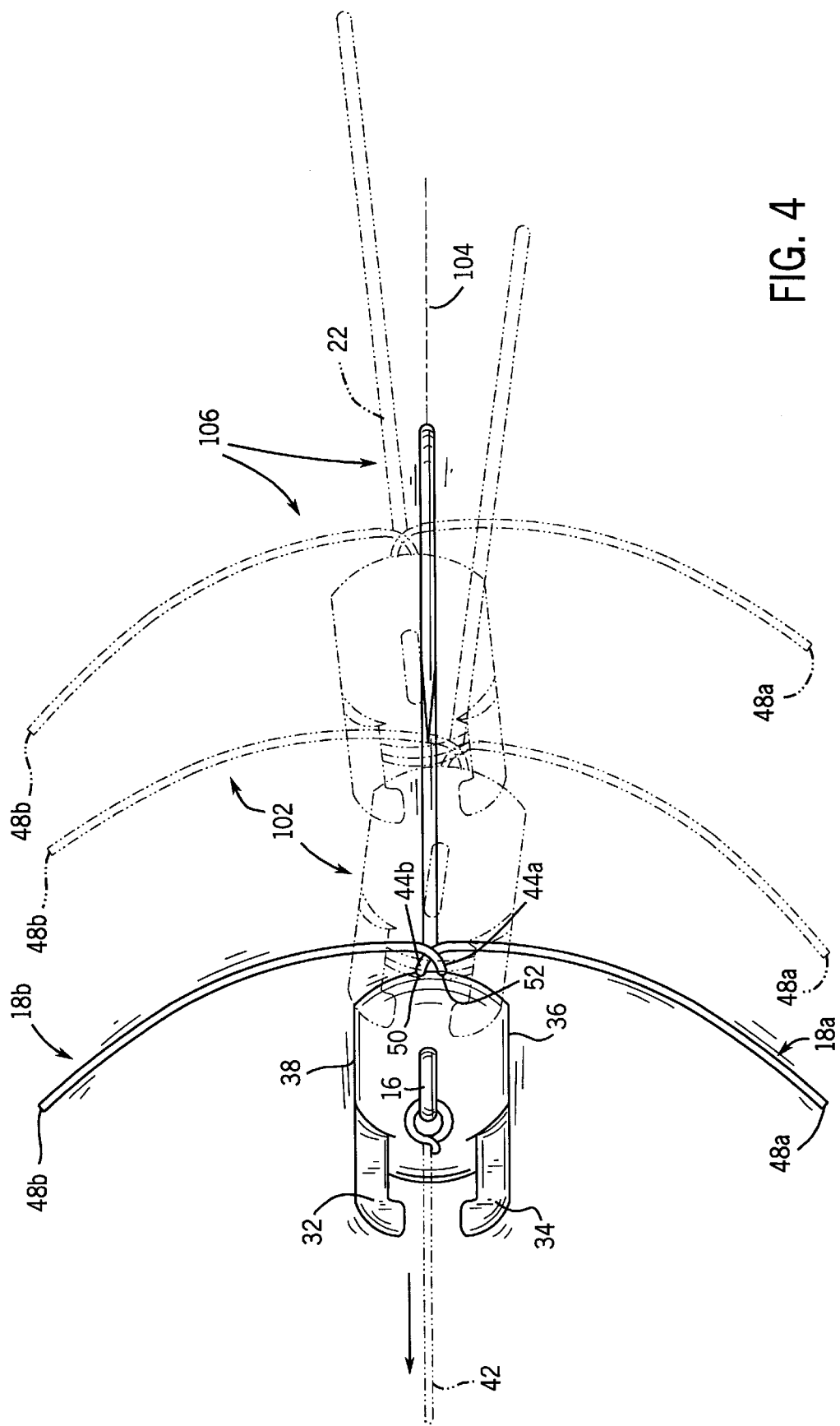
FIG. 4 is a top plan view of the fishing lure of FIG. 1 in operation, showing the oscillating positions of the lure in phantom.

In the preferred embodiment of the invention, as shown in FIGS. 1 and 4, the body 30 includes a pair of flat side surfaces 36 and 38. The material removed from the generally spherical body 30 to create the flat side surfaces 36 and 38 is repositioned forwardly of the vertical axis 35 to create the pair of weights 32 and 34.

The attachment eye 16 generally defines an opening 40 through which the fishing line 42 is attached. The attachment eye 16 is generally positioned along the vertical axis 35 passing through the center of the generally spherical body 30. The attachment eye 16 can be attached to the body 30 by any conventional means such as welding, or, preferably, the attachment eye 16 can be formed at the end of the shank 22, which extends into the molded head 12 and contains a nearly 90° bend, as shown in FIGS. 8 and 9. The portion of shank 22 containing eye 16 protrudes from the molded head 30 such that the attachment eye 16 is securely mounted to head 30, as shown.

Resilient spring arms 18a and 18b generally consist of first ends 44a and 44b, body portions 46a and 46b, and second ends 48a and 48b, respectively. Each of the spring arms 18a and 18b is preferably a single strand of stainless steel wire positioned transverse to the longitudinal axis of the hook member 22. Alternately, the spring arms 18a and 18b could be constructed of plastic, non-ferrous metal and/or other resilient material.

As can best be seen in FIG. 4, the spring arm 18a is joined to the body 30 at a point 50, while the spring arm 18b joined to the body 30 at a point 52. Each of the attachment points 50 and 52 are located on opposite sides of the shank 22. Although the spring arms 18a and 18b are shown as securely connected to the body 30, the spring arms 18a and 18b could be detachable from the body 30 such that they could be transferred to another jig and/or suitable fishing lure or bait. The spring arms 18a and 18b are curved, and extend upwardly from body 30 so as to cross each other vertically above the shank 22, such that the first end 44a and 44b of each spring arm is on an opposite side of the shank from the second end 48a and 48b of the same spring arm. Therefore, the spring arms generally meet at a point of intersection labeled 54.

Figure 3:
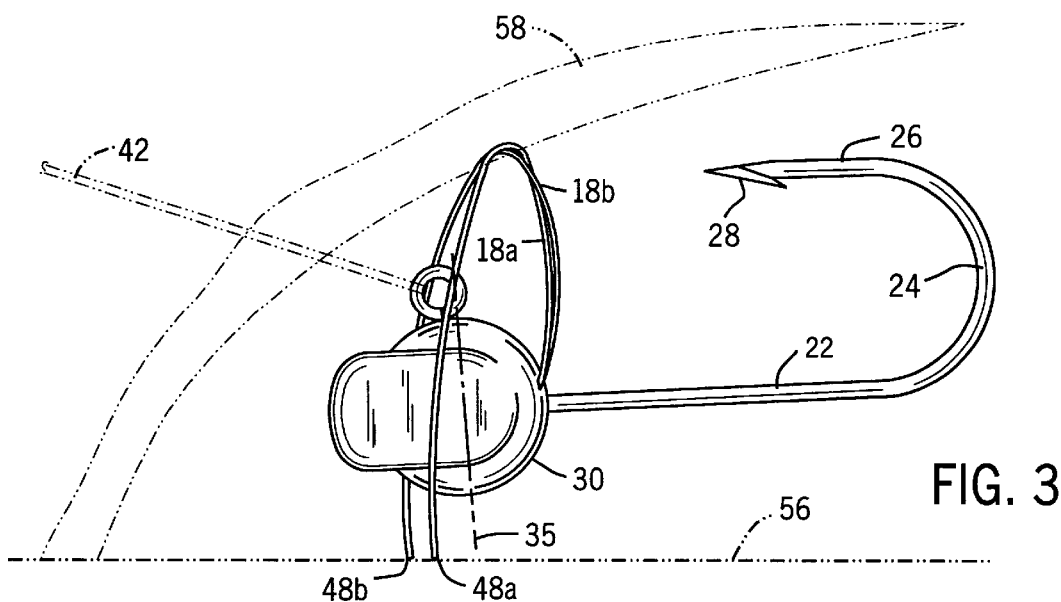
FIG. 3 is a side elevation view similar to FIG. 1, showing the lure in an operating position.
Figure 5:
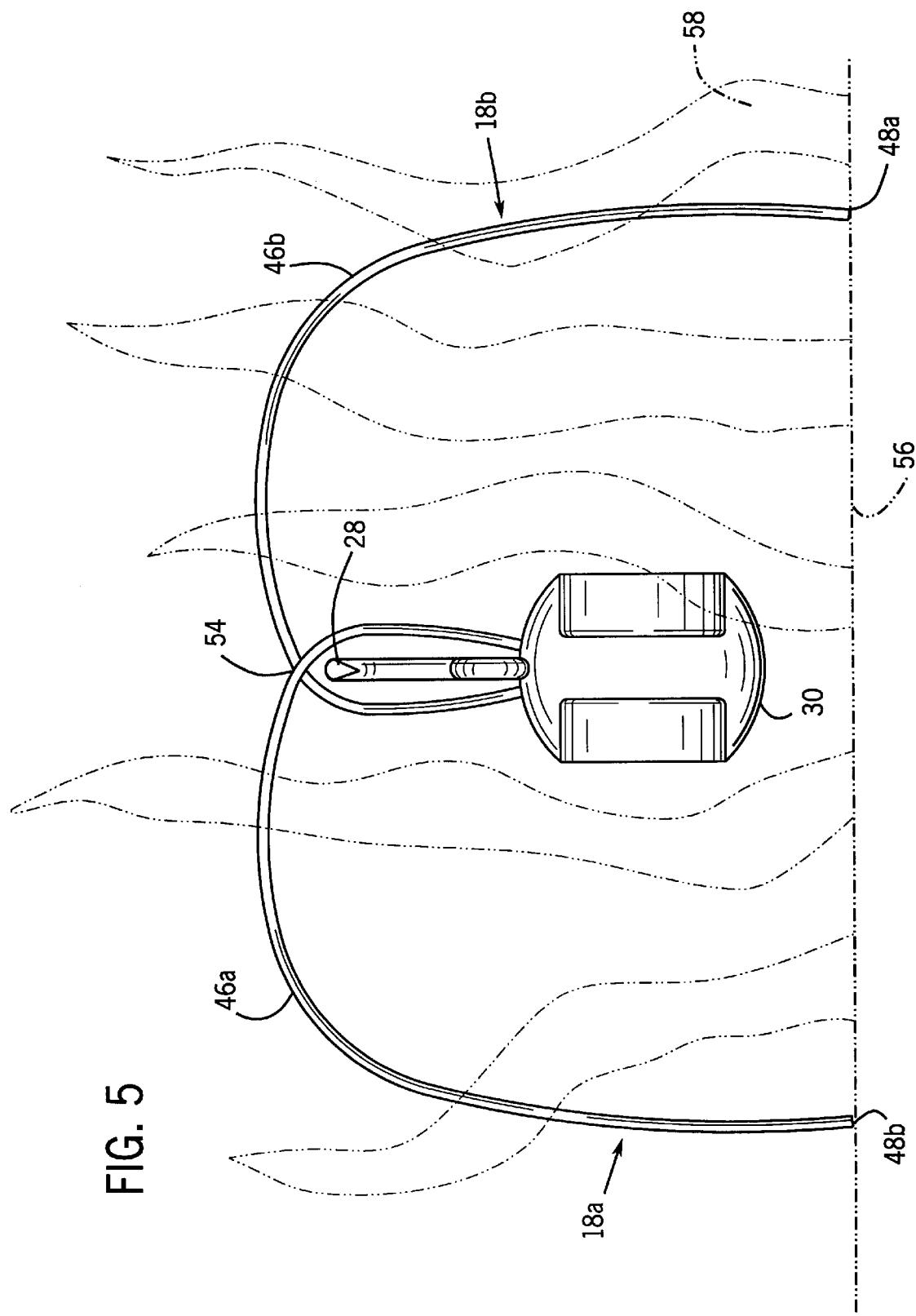
FIG. 5 is a front elevation view of the fishing lure of FIG. 1 in an operating position.

As can best be seen in FIG. 5, the point of intersection 54 between the two spring arms 18a and 18b is located above the barb 28. The spring arms 18a and 18b extend upward from the body 30 to a height greater than the distance between the tail section 26 and the shank 22 of hook member 14. Upon reaching this height, the body 46a,46b of each spring arm extends laterally over the shank 22 and downward until it terminates at a second end 48a and 48b. The second ends 48a and 48b of the spring arms 18a and 18b are below the lowermost point of the body 30, as can be seen in FIGS. 3 and 5.

Additionally, the spring arms 18a and 18b extend forward from their point of connection to the rear end of the body 30 as can be seen in FIG. 2. At rest, spring arm lower ends 48a,48b are located forwardly of body 30, as shown in FIG. 2. In use, spring arm lower ends 48a,48b are located rearwardly of the forwardmost extent of body 30, as shown in FIGS. 3 and 4. Each of the spring arms 18a and 18b is constructed of a piece of stainless steel wire which is strong enough to maintain its shape during use, but flexible enough to yield to a force applied to it.

The operation of the fishing lure 10 is as follows. The fisherman first casts the lure 10 into the water and allows it to sink to the bottom of the lake or river. Upon reaching the bottom, the lure 10 assumes the position as shown in FIG. 2, in which the fishing line 42 contains slack. When resting upon the bottom 56, the second ends 48a and 48b of the spring arms 18a and 18b are positioned well in front of the body 30.

Once the lure reaches the bottom, the fisherman begins to reel in the fishing line 42. This places tension on the fishing line 42 and causes lure 10 to assume its operative position, as shown in FIG. 3. Since each of the second ends 48a and 48b are in contact with the bottom 56, tension in the fishing line 42 causes the body 50 to move forwardly relative to the spring arms 18a and 18b against the forward bias of spring arms 18 and 18a toward their rest position of FIG. 2, such that the second ends 48a and 48b are no longer positioned forward of the body 30 (see FIGS. 2 and 3).

As the body 30 continues to be pulled forward by the fishing line 42, the spring arms 18a and 18b continue to flex rearwardly until its respective second end 48a or 48b releases contact with the bottom 56. When one of the second ends 48a or 48b disengages from the bottom 56, the fishing lure 10 is pivoted about the other second end 48a or 48b which remains in contact with the bottom 56. The forward pulling force from the fishing line 42 causes the fishing lure to rotate or pivot about the second end 48a or 48b still in contact with the bottom 56. This rotation about second end 48a or 48b causes the shank 22 to swing to the side and off the general straight line of travel of line 42, as designated by reference numeral 104 in FIG. 4.

A specific example of the operation of the fishing lure 10 will be described by referring again to FIG. 4. When the second end 48a of the spring arm 18a releases from the bottom 56, the lure 10 will rotate about the second end 48b as shown by the phantom lines designated 102. In this position, the shank 22 is moved away from the center line 104 toward the second end 48a.

As the fishing lure 10 rotates, the second end 48a will again contact the bottom 56. Since the contact point between second end 48a and the bottom 56 will now be located forward from the contact point between the second end 48b and the bottom 56, the second end 48b will then release its contact with the bottom. The fishing lure 10 will then rotate about the second end 48a and swing the shank 22 to the other side of the center line as shown in phantom at 106. In this manner, the fishing lure 10 provides movement of the bait which is attached to the hook member 14 which simulates lure movement of a swimming or crawling aquatic creature, as the lure is pulled along the bottom 56.

Along with simulating live bait, the spring arms 18*a* and 18*b* also act as a weed deflector, as best shown in FIG. 3. When a weed, such as that shown in phantom at 58, contacts either one or both of the spring arms 18*a* and 18*b*, the weed 58 rides over the curved upper ends of spring arms 18*a*,18*b*. Since each of the spring arms 18*a* and 18*b* extend upward to a position above the height of the tail section 26 (FIG. 5), the weed 58 is deflected away from the barb 28. In heavy weed conditions, spring arms 18*a*,18*b* are deflected rearwardly such that the intersection 54 of arms 18*a*,18*b* is located adjacent or over barb 28. The pair of spring arms 18*a* and 18*b* therefore prevent the weed 58 from becoming ensnared in the tail section 26 and barb 28.

The pair of weights 32 and 34 reposition the center of gravity of the body 30 forward from the spherical vertical axis 35, as previously described. Since the center of gravity of the head 12 is located forwardly of the vertical axis 35 passing therethrough, and hence forward of the attachment eye 16, the weight of the body 30 tends to urge the second ends 48*a* and 48*b* of the spring arms 18 and 20 into contact with the bottom 56. If weights such as 32,34 were not included on the head 12, the lure would not operate as efficiently, since the spring arm second ends 48*a* and 48*b* would not be forced downward into contact with the bottom as effectively. This would therefore limit the amount the lure could oscillate from the center line 104.

Figure 6:
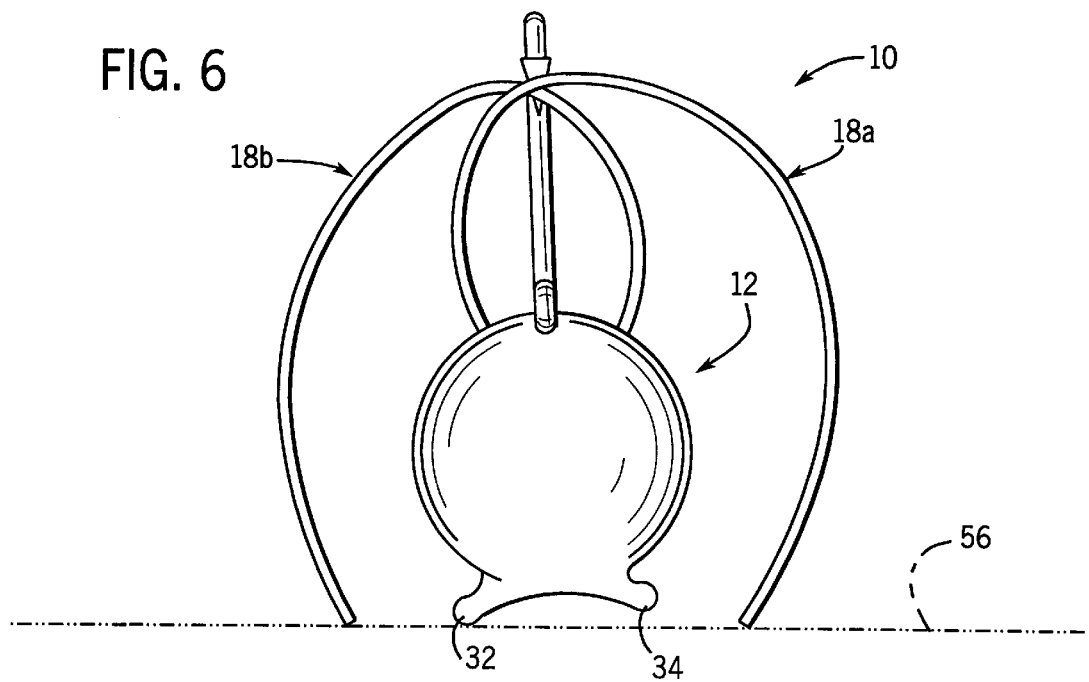
FIG. 6 is a front elevational view of an alternate embodiment of the fishing lure shown in FIGS. 1–5, shown in a resting position.
Figure 7:
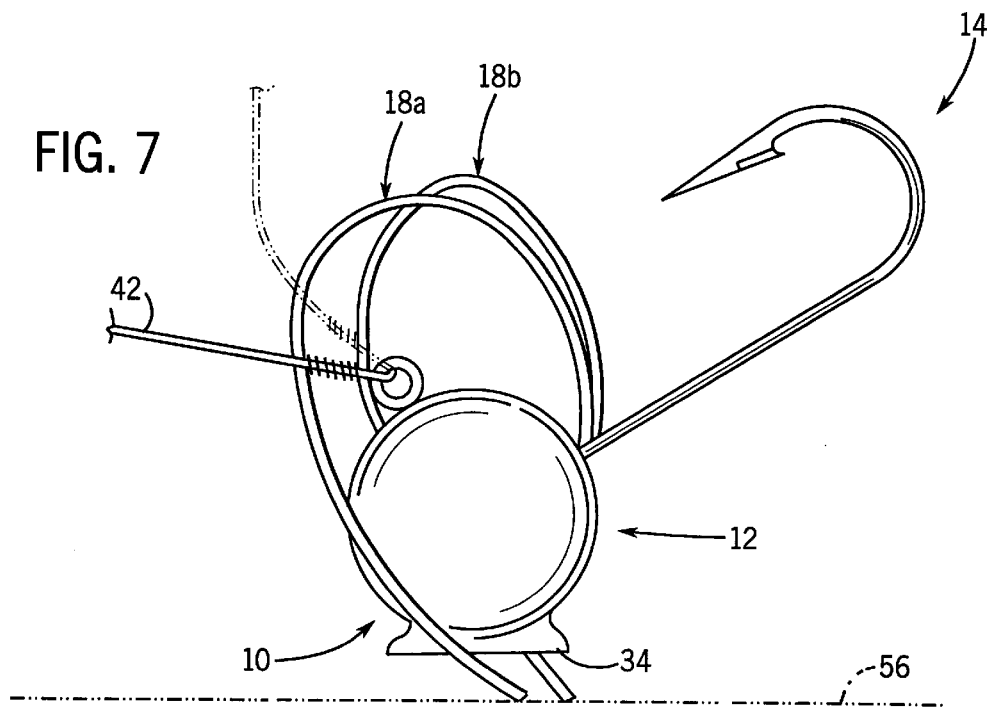
FIG. 7 is a side elevational view of the fishing lure of FIG. 6, showing the lure in an operating position.

FIGS. 6 and 7 show an alternate embodiment of the molded head 12 of the fishing lure 10. As shown in these two figures, the pair of weights 32 and 34 are repositioned near the bottom of the molded head 12 rather than extending out past the front of the molded head 12 as previously discussed. By positioning the weights as shown, the hook member 14 will be positioned at a greater angle relative to the bottom 56 as the lure 10 is reeled in by line 42. Positioning the weights 32 and 34, as shown in FIGS. 6 and 7 causes the center of gravity of the molded head 12 to be positioned lower than the embodiment shown in FIGS. 1–5.

FIGS. 8 and 9 show a second embodiment of the fishing lure 10. To facilitate understanding, the reference numerals from the first embodiment have been maintained for corresponding parts of the second embodiment. The fishing lure 60 of the second embodiment includes a pair of spring arms 62 and 64 which are joined to the body 30 of the molded head 12. Unlike the first embodiment, the second end 66*a* and 66*b* of each spring arm 62 and 64 respectively, is on the same side of the shank 22 as the point of connection between the spring arm 62 and 64 and the body 30. As can best be seen in FIG. 9, the spring arms 62 and 64 do not cross or contact each other as in the first embodiment shown in FIGS. 1–5.

Included on each second end 66*a* and 66*b* of the spring arms 62 and 64 is a float 68. Each float 68 is preferably an oblong shaped member securely attached to the second end 66*a* or 66*b* of each spring arm. In the preferred embodiment of the invention, each of the floats 68 is a molded expanded foam body attached to the spring arms by the use of an adhesive. Although the floats 68 are preferably formed of foam, any material having a specific gravity less than 1.0 would be a suitable equivalent.

Spring arms 62,64 are configured such that, when floats 68 are not engaged with a surface as shown in FIGS. 8 and 9, spring arm lower ends 66*a*,66*b* and floats 68 are positioned below the lower extent of head 12. Preferably, the floats 68 are of such a size that when the fishing lure 60 is used, the floats 68 cause spring arms 62,64 to deflect upwardly and outwardly such that the molded head 12 floats at or near the water surface. When a piece of bait is attached to the hook member 14, the bait will be located slightly below the surface of the water, while the molded head 12 will be at or near the water surface.

As the fishing lure 60 is reeled in by the fishing line 42, the floats 68 tend to bounce across the water surface and to simulate the movement of live bait. Because the fishing lure 60 is no longer near the lake or river bottom, the spring arms 62 and 64 no longer need to deflect weeds away from the barb 28, as previously disclosed. Although the spring arms 62 and 64 are specifically shown in the floating embodiment of FIGS. 8 and 9, the spring arms 18*a* and 18*b* of the first embodiment shown in FIGS. 1–5 could be modified to include floats 68 while still operating under the scope of the invention.

Along with the function previously discussed, the floats 68 allow the use of a heavier fishing lure 60 which increase the ability to cast the lure a further distance. The floats 68 act to slow the sinking of the fishing lure 60 such that the heavier lure acts like a lighter lure in the water.

FIG. 10, shows an alternate embodiment of the molded head 12 for use with either of the above-described embodiments of the invention. As shown in the cross section of FIG. 10, the body 30 of head 12 can be a hollow structure having a spherical outer wall 70 defining a hollow open interior 72. The shank 22 of the hook member 14 extends into the open interior 72 through the spherical wall 70 and contains a nearly 90° bend before exiting the open interior 72 through the spherical wall 70. The shank 22 then terminates on the exterior of the body at the attachment eye 16. Included in the open interior 72 of the body 30 is a ball 74. The ball 74 is of a size such that it can freely move about within the open interior 72.

As the fishing lure 10 or 60 oscillates, the ball 74 contacts the interior surface 75 of the spherical wall 70 to generate a sound. The ball 74 can be made of the same metallic material as the molded head 12, or any other material, such that when the ball 74 strikes the spherical wall 70, it produces a sound. The sound produced by the contact of the ball 74 and the interior surface 75 of the spherical wall 70 acts to further attract fish.

FIG. 11 shows a second alternate embodiment of the molded head 12 for use with either embodiment of the invention. In the second alternate embodiment of FIG. 11, the body 30 includes a spherical wall 70 surrounding an open interior 72. Much like the embodiment shown in FIG. 10, the shank 22 extends into the open interior 72 and exits through the spherical wall 70 and terminates at an attachment eye 16. Unlike the embodiment shown in FIG. 10, however, the second alternate embodiment of FIG. 11 includes an inlet/outlet port 76. The port 76 allows a liquid, such as fish attractant 78, to be placed into the open interior 72. As the fishing lure 10 is used, the fish attractant 78 escapes through the port 76 to further attract fish. When the open interior 72 becomes empty, the fisherman then uses the port 76 to refill the open interior 72 with fish attractant 78.

FIG. 12 shows a third alternate embodiment of the molded head 12 for use with either embodiment of the invention. FIG. 12 is a vertical cross section of the molded head 12 and shows the top half 80 of the molded head 12 and the bottom half 82 formed of dissimilar materials, depending upon the features required by the fisherman. For example, the top 80 may be comprised of a plastic material and the bottom 82 comprised of a metal such as lead, such that the molded head 12 would have a center of gravity located below the horizontal midpoint of the generally spherical molded head 12. Alternatively, the top 80 may be comprised of a sponge-like material, while the bottom 82 may be comprised of metal, such that fish attractant could be absorbed by the sponge-like material.

Although the preferred embodiments of the invention have been described and illustrated, it will be understood that the invention is not limited to the embodiments disclosed, but is capable of numerous rearrangements, modifications, and substitution of parts and elements without departure from the spirit of the invention. Accordingly, the scope of the invention should be determined by the appending claims and their legal equivalent.

I claim:

1. A fishing lure comprising:

a hook member having a shank and terminating in a hook portion extending laterally from the shank;

a head from which the shank extends, wherein the hook portion extends in a first direction relative to the head;

an attachment eye interconnected with the head to provide a point of connection to a fishing line; and a pair of resilient spring arms extending outwardly from the head in opposite directions, each spring arm having a first end attached to the head and a second end extending in a second direction opposite the first direction and disposed below the head, wherein the spring arm second ends are located on either side of the head and the hook member.

2. The fishing lure of claim 1, wherein each spring arm extends upward from its first end to a point between its first and second ends which is at an elevation above the hook portion.

3. The fishing lure of claim 1, wherein the head is comprised of metal having a specific gravity greater than 1.0.

4. The fishing lure of claim 3, wherein the head is generally spherical in shape.

5. The fishing lure of claim 3, wherein the head includes a weight to position the center of gravity of the fishing lure forward of the attachment eye.

6. The fishing lure of claim 5, wherein the weight comprises a pair of metal members connected one on either side of the head.

7. The fishing lure of claim 1, wherein the second end of each spring arm engages the bottom of a body of water in which the fishing lure is being used, so as to resist movement of the fishing lure and to impart side-to-side action to the hook member upon movement of the fishing lure through the water.

8. The fishing lure of claim 1, wherein the head includes an outer wall surrounding an open interior.

9. The fishing lure of claim 8, wherein the open interior includes a ball, such that the ball can freely move within the open interior.

10. The fishing lure of claim 8, wherein the outer wall includes an inlet/outlet port providing communication between the open interior of the head and the exterior of the head.

11. The fishing lure of claim 1, wherein the head is formed from a pair of dissimilar materials.

12. A fishing lure comprising:

a hook member having a shank and a hook portion;

a head from which the shank extends;

an attachment eye interconnected with the head to provide a point of connection to a fishing line; and a pair of resilient spring arms extending outwardly from the head in opposite directions, each spring arm having a first end attached to the head and a second end disposed below the head, wherein the spring arm second ends are located on either side of the head and the hook member, wherein each spring arm extends upward from its first end to a point between its first and second ends which is at an elevation above the hook portion, and wherein the spring arms are configured to cross each other at a point of intersection located between the first and second end of each spring arm, said point of intersection being at an elevation above the hook portion.

13. The fishing lure of claim 12, wherein the spring arms are deflectable toward the hook portion upon contacting an object between the first and second ends, such that upon contact, the spring arms maintain the object out of contact with the hook portion.

14. A fishing lure comprising:

a hook member having a shank and a hook portion;

a head from which the shank extends;

an attachment eye interconnected with the head to provide a point of connection to a fishing line; and a pair of resilient spring arms extending outwardly from the head in opposite directions, each spring arm having a first end attached to the head and a second end disposed below the head, wherein the spring arm second ends are located on either side of the head and the hook member, wherein each spring arm extends upward from its first end to a point between its first and second ends which is at an elevation above the hook portion, and wherein the first end of a first of the spring arms is fixed to the head at an opposite side of the hook portion from the first end of a second one of the spring arms, and wherein the second end of each spring arm is located on the opposite side of the hook portion from the first end of the same spring arm.

15. A fishing lure comprising:

a hook member having a shank and a hook portion;

a head from which the shank extends in a rearward direction;

an attachment eye interconnected with the head to provide a point of connection to a fishing line; and a pair of resilient spring arms extending outwardly from the head in opposite directions, each spring arm having a first end attached to the head and a second end disposed below the head, wherein the spring arm second ends are located on either side of the head and the hook member, and wherein the second end of each spring arm is located forwardly of the first end.

16. A fishing lure comprising:

a hook member having a shank and a hook portion;

a head from which the shank extends;

an attachment eye interconnected with the head to provide a point of connection to a fishing line;

a pair of resilient spring arms extending outwardly from the head in opposite directions, each spring arm having a first end attached to the head and a second end disposed below the head, wherein the spring arm second ends are located on either side of the head and the hook member; and a float positioned on the second end of each spring arm.

17. The fishing lure of claim 16, wherein the float has a specific gravity less than 1.0.

18. A fishing lure comprising:
- a hook member extending along a longitudinal axis and having a shank and a hook portion;
- a head mounted to the shank at an end opposite the hook portion;
- an attachment eye positioned on the head for providing a point of connection to a fishing line; and
- a pair of resilient spring arms positioned transverse to the longitudinal axis of the hook member, each spring arm having a first and a second end, the first end of each spring arm being attached to the head and each spring arm terminating at its second end;
- wherein each spring arm extends upward from its first end to a height above the hook portion and wherein the spring arms intersect at a point between their first and second ends above the hook portion.

19. The fishing lure of claim 18, wherein the second end of each spring arm is disposed below the head, such that the second end engages the bottom of a body of water in which the fishing lure is being used.

20. The fishing lure of claim 19, wherein each of the spring arms is configured such that the second end of each spring arm is positioned forward from the first end to provide a bias against forward movement of the fishing lure when the spring arm second ends are engaged with a surface, such that when the fishing lure is moved forward, each spring arm tends to resist such movement.

21. The fishing lure of claim 18, wherein the spring arms are rearwardly deflectable such that when the spring arms contact an object between their first and second ends, the spring arms direct the object away from the hook portion of the hook member.

22. The fishing lure of claim 18, further comprising a pair of weights joined to the head, whereby the weights locate the center of gravity of the fishing lure forward of the attachment eye.

23. The fishing lure of claim 18, wherein the head is substantially spherical in shape and the attachment eye is positioned along a generally vertical axis passing through the center of the spherical head.

24. A fishing lure comprising:
- a hook member extending along a longitudinal axis having a shank and a hook portion;
- a head mounted to the shank at an end opposite the hook portion;
- an attachment eye positioned on the head for providing a point of connection to a fishing line; and
- a pair of resilient spring arms positioned transverse to the longitudinal axis of the hook member, each spring arm having a first and a second end, the first end of each spring arm being attached to the head and terminating at the second end, the second end of each spring arm extending below the head to engage the bottom of the body of water in which the fishing lure is being used, the resilient spring arms thereby resisting forward movement of the fishing lure, said spring arms intersecting at a point between the first and second end of each spring arm, said point of intersection being above the height of the hook portion such that upon contacting an object, the spring arms deflect rearward to direct the object away from the hook portion on the hook member.

25. In a fishing lure including a head having an attachment eye and a hook extending rearwardly from the head and terminating in a forwardly extending hook end which is located rearwardly of the head and at an elevation above that of the head, the improvement comprising resilient deflector structure mounted to the head and extending upwardly therefrom to an elevation above that of the hook end, wherein the resilient deflector structure is spaced forwardly of the hook end and is bendable toward the hook end when the resilient deflector structure strikes an object during forward movement of the lure to prevent the object from contacting the hook end, wherein the resilient deflector structure comprises a pair of resilient spring arms extending outwardly from the head in opposite directions, each spring arm having a first end attached to the head and a second end disposed below the head, wherein the spring arm second ends are located on either side of the head and the hook end.

26. The improvement of claim 25, wherein the spring arms are configured to cross each other at a point of intersection located between the first and second end of each spring arm, said point of intersection being at an elevation above the hook end.

27. The improvement of claim 26, wherein the first end of a first one of the spring arms is fixed to the head at an opposite side of the hook end from the first end of a second one of the spring arms, and wherein the second end of each spring arm is located on the opposite side of the hook end from the first end of the same spring arm.

28. In a fishing lure including a head having an upper and an lower end, an attachment eye, and a hook extending axially from the head and terminating in a hook end, the improvement comprising a pair of resilient members interconnected with the head and extending upwardly and outwardly therefrom such that one resilient member is located on each side of a pair of opposite sides defined by the head, wherein each resilient member defines an uppermost point and extends downwardly therefrom, terminating in an outer end disposed below the lower end of the head and adapted to contact a surface to bias the head upwardly relative to the surface, wherein the resilient members are constructed and arranged to resist forward movement as the lure is pulled forwardly through the water to impart a side-to-side action to the hook member.

* * * * *